United States Patent [19]
Stephenson

[11] Patent Number: 5,161,577
[45] Date of Patent: Nov. 10, 1992

[54] FLUID CONTROLLER HAVING ROTARY/AXIAL VALVING, AND SPRING ARRANGEMENT THEREFOR

[75] Inventor: Dwight B. Stephenson, Savage, Minn.

[73] Assignee: Eaton Corporation, Cleveland, Ohio

[21] Appl. No.: 793,061

[22] Filed: Nov. 15, 1991

Related U.S. Application Data

[63] Continuation-in-part of Ser. No. 666,168, Mar. 7, 1991, Pat. No. 5,065,793, which is a continuation-in-part of Ser. No. 513,366, Apr. 23, 1990, Pat. No. 5,016,672.

[51] Int. Cl.[5] ............................................. F15B 9/08
[52] U.S. Cl. ............................... 137/625.24; 60/384; 91/467
[58] Field of Search ............... 60/384; 137/625.24; 91/467

[56] References Cited

U.S. PATENT DOCUMENTS

| | | |
|---|---|---|
| 3,819,307 | 6/1974 | Uppal . |
| 4,232,708 | 11/1980 | Miller . |
| 5,016,672 | 5/1991 | Stephenson ............ 137/625.24 |
| 5,065,793 | 11/1991 | Stephenson et al. ...... 137/625.24 |
| 5,080,135 | 1/1992 | Stephenson ............ 137/625.24 |
| 5,115,640 | 5/1992 | Stephenson et al. ............ 60/384 |

Primary Examiner—Gerald A. Michalsky
Attorney, Agent, or Firm—L. J. Kasper

[57] ABSTRACT

A fluid controller (11) is provided of the type which controls the flow of fluid from a source to at least a first fluid pressure operated device. The controller is of the type including a primary, spool valve (39;39') and a follow-up sleeve valve (41;41'). The spool and sleeve are of the type in which relative rotation therebetween defines a main fluid path through a fluid meter (23), and in which axial movement of the sleeve (39') defines a parallel fluid path (FIG. 7) or an auxiliary fluid path. A neutral centering spring arrangement is provided including at least one compression spring (101) having its ends disposed in engagement with seat members (97,99) to bias the spool and sleeve toward their neutral rotary position. The compression springs (101) are disposed in annular grooves (93,95) defined by the sleeve and spool, respectively, with one of the grooves being configured to permit relative axial movement between the spool and sleeve, as the sleeve is displaced away from its neutral axial position (FIG. 6), or away from its first axial position (FIG. 9).

24 Claims, 7 Drawing Sheets

FLUID CONTROLLER HAVING ROTARY/AXIAL VALVING, AND SPRING ARRANGEMENT THEREFOR

CROSS-REFERENCE TO RELATED APPLICATION

This application is a Continuation-In-Part (CIP) of co-pending application U.S. Ser. No. 666,168, filed Mar. 7, 1991 in the name of Dwight B. Stephenson and Dennis R. Marks for a "FLUID CONTROLLER, WITH LOAD SENSING PRIORITY FLOW CONTROL CAPABILITY", now U.S. Pat. No. 4,065,793, which is a Continuation-In-Part of co-pending application U.S. Ser. No. 513,366, filed Apr. 23, 1990, in the name of Dwight B. Stephenson, for a "STEERING VALVE WITH INTEGRAL PARALLEL CONTROL", now U.S. Pat. No. 5,016,672.

BACKGROUND OF THE DISCLOSURE

The present invention relates to fluid controllers of the type which are utilized to control the flow of fluid from a fluid source to one or more fluid pressure operated devices, and more particularly, to such controllers of the type in which the controller valving is capable of providing two different types of valving action, one in response to rotary actuation, and the other in response to axial actuation.

Although the present invention may be utilized in various types of fluid controllers, having various types of valving, it is especially adapted for use in a fluid controller of the type including a rotatable valve spool and a relatively rotatable, follow-up valve sleeve. In the conventional, prior art controller, the valving action performed within the controller was in response to relative rotation between the spool and sleeve, typically initiated by rotation of a vehicle steering wheel, controlling the flow of fluid from a source to a vehicle power steering cylinder.

In related U.S. Pat. No. 5,016,672, assigned to the assignee of the present invention, the spool and sleeve define not only the conventional main fluid path in response to rotary valve actuation, but also, the spool and sleeve define a parallel fluid path in response to axial motion of the sleeve relative to the spool and housing. In the cited patent, the axial motion of the sleeve can be in either axial direction from a neutral axial position, and is achieved in response to some sort of pilot pressure, acting on one end of the sleeve, or the other.

In a fluid controller in which there is both rotary valve actuation and axial valve actuation, the conventional leaf-spring type of neutral centering arrangement may not be fully satisfactory. The centering spring arrangement must perform the basic function of biasing the spool and sleeve to their relative neutral rotary position, while at the same time, permitting relative axial motion therebetween. In addition, the centering spring arrangement must not provide a leakage path or "short-circuit" of any pressurized fluid being used as a pilot pressure.

SUMMARY OF THE INVENTION

Accordingly, it is an object of the present invention to provide an improved neutral centering spring arrangement for use in a fluid controller of the type having spool and sleeve valving, wherein the spool and sleeve are engaged in both rotary actuation and axial actuation.

The above and other objects of the invention are accomplished by the provision of an improved controller operable to control the flow of fluid from a source of pressurized fluid to a fluid pressure operated device. The controller is of the type including housing means defining a fluid inlet port for connection to the source of pressurized fluid, a return port for connection to a system reservoir, and first and second control fluid ports for connection to the fluid pressure operated device. Valve means is disposed in the housing means and comprises a primary, rotatable valve member and a cooperating, relatively rotatable follow-up valve member. The primary and follow-up valve members define a neutral rotary position, and a first rotary operating position in which the primary valve member is rotatably displaced from the neutral rotary position, relative to the follow-up valve member. The follow-up valve member defines a neutral axial position relative to the primary valve member. The housing means and the primary and follow-up valve members, when in the first rotary operating position, cooperate to define a main fluid path providing fluid communication from the fluid inlet port to the first control fluid port, and from the second control fluid port to the return port.

The improved controller is characterized by the follow-up valve member defining a first axial operating position relative to the primary valve member, in which the housing means and the primary and follow-up valve members define a parallel fluid path providing fluid communication from the fluid inlet port to the first control fluid port and from the second control fluid port to the return port. The primary valve member and the follow-up valve member cooperate to define an annular spring chamber, and the primary valve member defines a first seat and the follow-up valve member defines a second seat. Compression spring means is disposed in the annular spring chamber, and includes a first end portion engaging the first seat, and a second end portion engaging the second seat, the compression spring means being operable to bias the primary and follow-up valve members from the rotary operating position toward the neutral rotary position. The spring chamber is configured to permit relative axial movement between the primary and follow-up valve members, as the follow-up valve members are displaced between the neutral axial position and the axial operating position.

DESCRIPTION OF THE PREFERRED EMBODIMENTS

Figure 1:
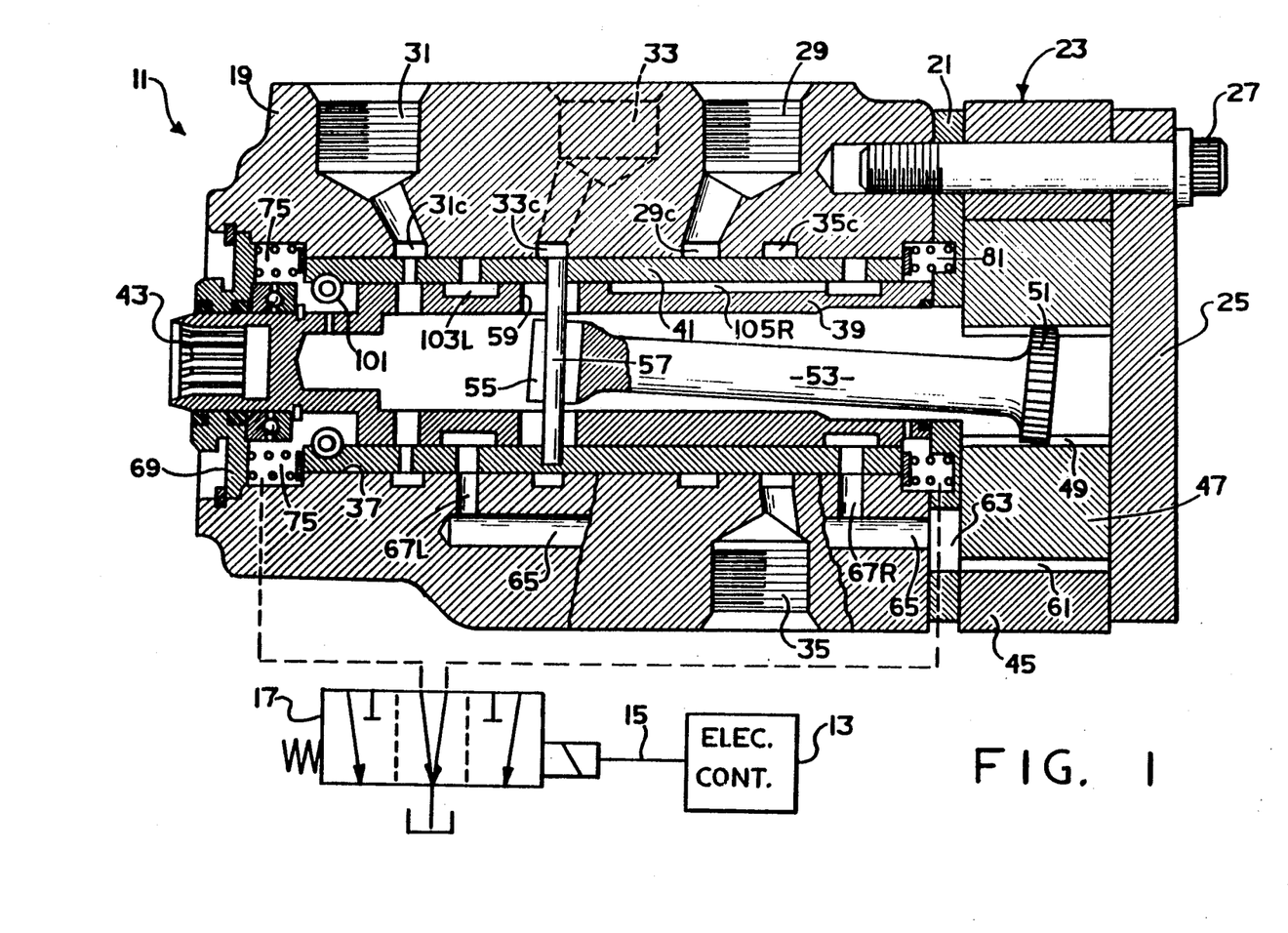
FIG. 1 is an axial cross-section of a fluid controller made in accordance with the present invention.

Referring now to the drawings, which are not intended to limit the invention, FIG. 1 illustrates a fluid controller, generally designated 11, the general function of which is to control the flow of fluid from a source of pressurized fluid (not shown) to a fluid pressure operated device such as a vehicle power steering cylinder (not shown), in response to an input motion, such as rotation of a vehicle steering wheel (not shown).

In accordance with a primary feature of the present invention, the fluid controller 11 includes valving which is able to perform two distinct, but related, functions, as was illustrated and described in related U.S. Pat. No. 5,016,672, issued to Dwight B. Stephenson, for a "STEERING CONTROLLER WITH INTEGRAL PARALLEL CONTROL", assigned to the assignee of the present invention, and incorporated herein by reference. The valving includes rotary valving, the function of which is to define a main fluid path to the steering cylinder, in response to rotation of the steering wheel, and axial valving, the function of which is to define a parallel fluid path to the steering cylinder, but with the axial fluid path being independent of the rotation of the steering wheel, and not flowing through the fluid meter of the controller. More specifically, the axial valving is controlled by actuation of an electronic controller 13, which transmits an electrical signal 15 to a pilot control valve 17. The pilot control valve 17 controls the axial valving within the fluid controller 11 in a manner to be described in greater detail subsequently.

Referring still to FIG. 1, the fluid controller 11 comprises several sections, including a valve housing section 19, a wear plate 21, a section comprising a fluid meter 23, and an endcap 25. These sections are held together in tight sealing engagement by means of a plurality of bolts 27 (only one of which is shown in FIG. 1), which are in threaded engagement with the valve housing 19.

The valve housing 19 defines a fluid inlet port 29, a return port 31, and control fluid ports 33 and 35. The valve housing section 19 further defines a valve bore 37, and rotatably disposed therein is a valving arrangement comprising a primary, rotatable valve member 39 (spool), and a cooperating, relatively rotatable follow-up valve member 41 (sleeve). At the forward end of the spool 39 is a portion having a reduced diameter, and defining a set of internal splines 43, which provide for a direct mechanical connection between the spool 39 and the vehicle steering wheel. The spool 39 and sleeve 41 will be described in greater detail subsequently, but it should be noted that the spool and sleeve together define both the rotary valving and the axial valving.

The fluid meter 23 may be of the type well known in the art, and in the subject embodiment, includes an internally-toothed ring member 45, and an externally-toothed star member 47, which is eccentrically disposed within the ring 45 for orbital and rotational movement relative thereto. The star 47 defines a set of internal splines 49, and in splined engagement therewith is a set of external splines 51 formed at the rearward end of a drive shaft 53. The drive shaft 53 has a bifurcated forward end 55 permitting driving connection between the shaft 53 and the sleeve 41, by means of a driving pin 57. The ends of the pin 57 pass through a pair of oversized pin openings 59 (see FIGS. 6 and 7), defined by the spool 39, and are received in relatively close-fitting openings in the sleeve 41.

As is well known to those skilled in the art, pressurized fluid flowing from the inlet port 29 through the various ports and passages defined by the sleeve 41 and spool 39 then flows through the fluid meter 23, causing orbital and rotational movement of the star 47 within the ring 45. Such movement of the star 47 causes rotational follow-up movement of the sleeve 41, by means of the drive shaft 53 and driving pin 57, to maintain a particular relative rotational displacement (referred to hereinafter as a "rotary operating position") between the spool 39 and sleeve 41, proportional to the rate of rotation of the steering wheel.

Referring still to FIG. 1, the valve bore 37 of the valve housing 19 defines a plurality of annular fluid chambers surrounding the sleeve 41, to provide fluid communication between the various ports and the outer surface of the sleeve 41. An annular chamber 29c receives pressurized fluid from the inlet port 29, while an annular chamber 31c communicates return fluid to the return port 31. An annular chamber 33c provides communication to or from the control port 33, while an annular chamber 35c provides communication to or from the control port 35.

The toothed interaction of the star 47, orbiting and rotating within the ring 45, defines a plurality of expanding and contracting fluid volume chambers 61, and adjacent each such chamber 61, the port plate 21 defines a fluid port 63. The valve housing 19 defines a plurality of axial bores 65 (only one of which is shown in FIG. 1), each of which is in open communication with one of the fluid ports 63. The valve housing 19 further defines a pair of radial bores 67L and 67R, providing communication between each of the axial bores 65 and the valve bore 37, as will be described in greater detail subsequently.

It is believed that the normal rotary operation of a controller of the general type shown in FIG. 1 is now well known to those skilled in the art, and such operation will be described only briefly herein. As the steering wheel is rotated, for example, in the clockwise direction (a right turn), the spool 39 is also rotated clockwise, as viewed by the vehicle operator, opening up a series of variable flow control orifices (comprising the rotary valving) between the spool 39 and the sleeve 41. These orifices permit fluid communication from the inlet port 29 through one or more orifices in series, and then through the radial bores 67R and the axial bores 65 to the expanding volume chambers 61 of the fluid meter 23. Metered fluid flowing from the contracting volume chambers 61 of the fluid meter flows through the other of the axial bores 65, then through the radial bores 67L, then through another variable orifice in the valving, and out the control fluid port 33 to the steering cylinder.

Low pressure fluid returning from the cylinder enters the control fluid port 35, then flows through another variable orifice in the valving, and then out to the return port 31. The above-described fluid path is the one which has been described herein as the "main fluid path", and the use of that term hereinafter will be understood to mean the above-described fluid path, or some portion thereof, when the spool and sleeve are in a rotary operating position.

Neutral Centering Arrangement

Disposed adjacent the forward end (left end in FIG. 1) of the spool 39 and sleeve 41, and also disposed adjacent the rearward end (right end in FIG. 1) of the sleeve 41 is a neutral centering spring arrangement, which comprises an important feature of the present invention. The neutral centering spring arrangement includes two distinct aspects: (1) rotary neutral centering; and (2) axial neutral centering.

Certain elements of the neutral centering spring arrangement of the present invention are illustrated in each of the following co-pending applications, each of which is assigned to the assignee of the present invention and incorporated herein by reference:

1. U.S. Ser. No. 602,829, filed Oct. 29, 1990, in the name of Dwight B. Stephenson for a "LARGE DEFLECTION ANGLE ROTARY MODULATION STEERING VALVE";

2. U.S. Ser. No. 666,168, filed Mar. 7, 1991, in the name of Dwight B. Stephenson and Dennis R. Marks for a "FLUID CONTROLLER WITH LOAD SENSING PRIORITY FLOW CONTROL CAPABILITY"; and 3. U.S. Ser. No. 703,318, filed May 20, 1991, now U.S. Pat. No. 5,115,640, in the names of Dwight B. Stephenson and James J. Hastreiter for an "IMPROVED FLUID CONTROLLER AND LOGIC CONTROL SYSTEM FOR USE THEREWITH".

Figure 2:
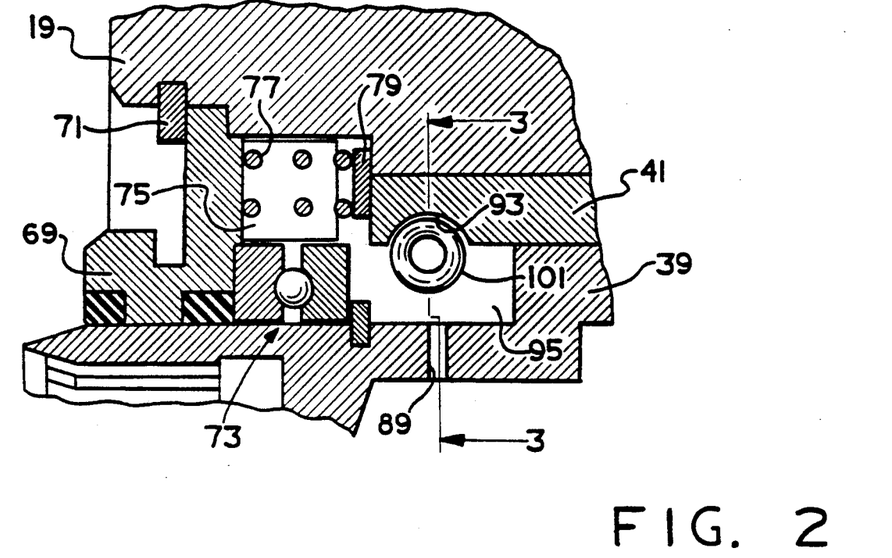
FIG. 2 is an enlarged, fragmentary, axial cross-section, similar to FIG. 1, illustrating in greater detail one aspect of the present invention.

Referring now primarily to FIG. 2, disposed radially between the valve housing 19 and the spool 39 is a seal gland 69, held in place relative to the valve housing 19 by means of a snap ring 71. As may best be seen by reference to above-incorporated U.S. Ser. No. 703,318, the seal gland 69 includes four arcuate portions which extend axially rearward (to the right in FIG. 2) from the main body of the seal gland 69. The arcuate portions are closely spaced apart from an adjacent internal surface defined by the valve housing 19, and disposed radially inwardly from the arcuate portions is a ball bearing set 73. The arcuate portions cooperate with the valve housing 19 and with the ball bearing set 73 to define four openings 75 (two of which are shown in FIG. 1, and one of which is shown in FIG. 2), which also serve as a pilot pressure chamber, and disposed within each of these openings 75 is a coiled compression spring 77. The springs 77 are seated against the main body of the seal gland 69 at their left end, and against a wear washer 79 at their right end.

Figure 5:
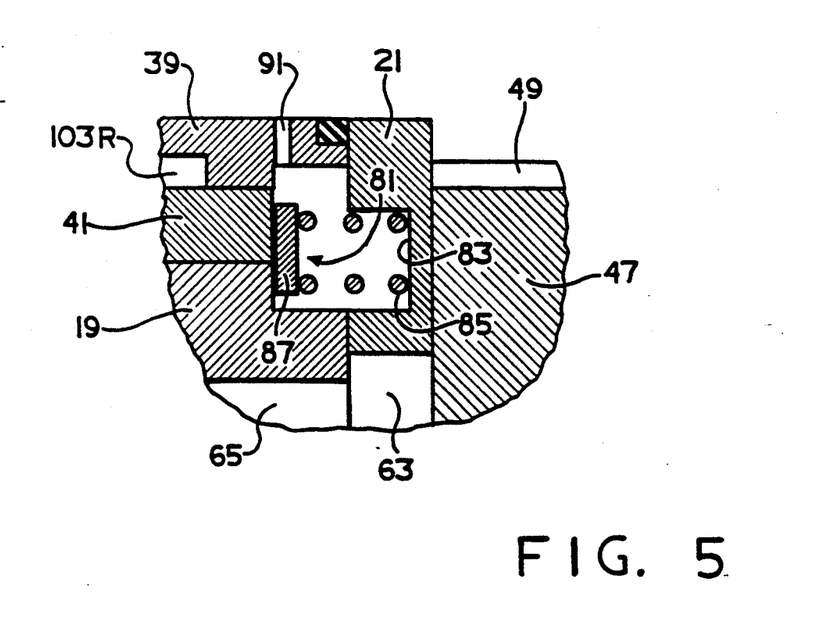
FIG. 5 is an enlarged, fragmentary, axial cross-section, similar to FIG. 1, illustrating another detailed aspect of the controller of FIG. 1.

Referring now to FIG. 5, there is illustrated an arrangement somewhat similar to that shown in FIG. 2, wherein the wear plate 21 and sleeve 41 cooperate to define an opening 81, which also serves as a pilot pressure chamber. The wear plate 21 also defines four circular openings 83 (only one of which is shown in FIG. 5), and disposed within each opening is a coiled compression spring 85. Each of the springs 85 has its right end in FIG. 5 seated against the wear plate 21, and its left end seated against a wear washer 87. The primary function of the springs 77 and 85 is to bias the sleeve 41 toward the neutral axial position shown in FIGS. 1, 2, 5, and 6, or, subsequent to the displacement of the sleeve 41 to an axial operating position (as shown in FIG. 7), to return the sleeve to the neutral axial position.

Referring still to FIGS. 2 and 5, the spool 39 defines a radial passage 89, which provides fluid communication from the interior of the spool into the pilot chamber 75, and a radial passage 91, which provides fluid communication from the interior of the spool into the pilot chamber 81. The fluid pressure within the interior of the spool 39 is preferably "regulated tank" pressure, i.e., a pressure of approximately 100 psi as a result of some sort of orifice or restriction disposed downstream of the return port 31. The use of such a regulated tank pressure for purposes of pilot control is well known in to those skilled in the art, and will not be described further herein. It should be noted, however, that the reservoir illustrated schematically in FIG. 1 downstream of the pilot control valve 17 is at conventional tank pressure, i.e., substantially 0 psi When pilot control valve 17 is in the centered position shown in FIG. 1, both pilot chambers 75 and 81 are drained to tank, and the springs 77 and 85 maintain the sleeve 41 in the neutral axial position. If the pilot valve 17 is shifted to the left from the centered position shown in FIG. 1, the pilot chamber 81 is drained, but regulated tank pressure will then build-up in the pilot chamber 75. Therefore, the sleeve is biased by the greater pressure in the pilot chamber 75, toward the right in each of the drawing figures, overcoming the biasing force of the springs 85. The sleeve 41 thus moves to an axial operating position, such as is illustrated in FIG. 7.

Figure 8:
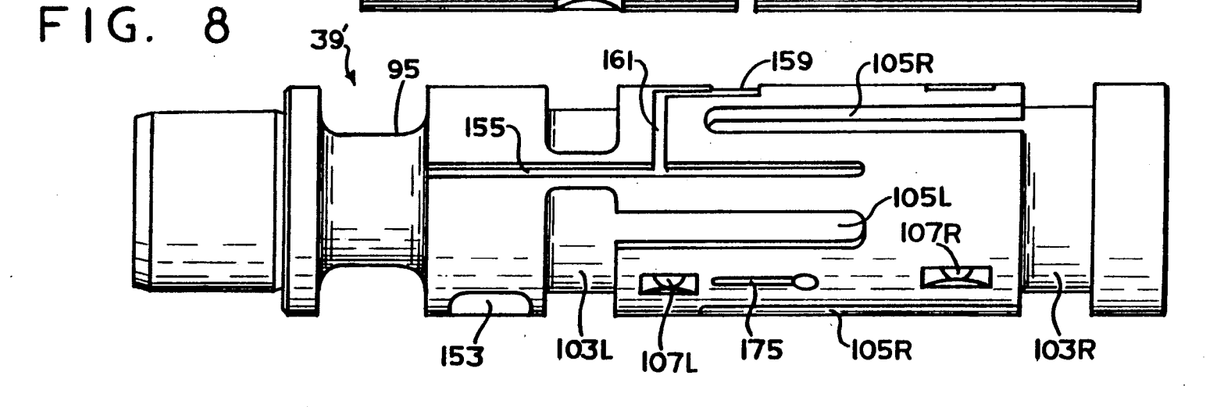
FIG. 8 is a plan view of a spool valve member of an alternative embodiment of the present invention.
Figure 10:
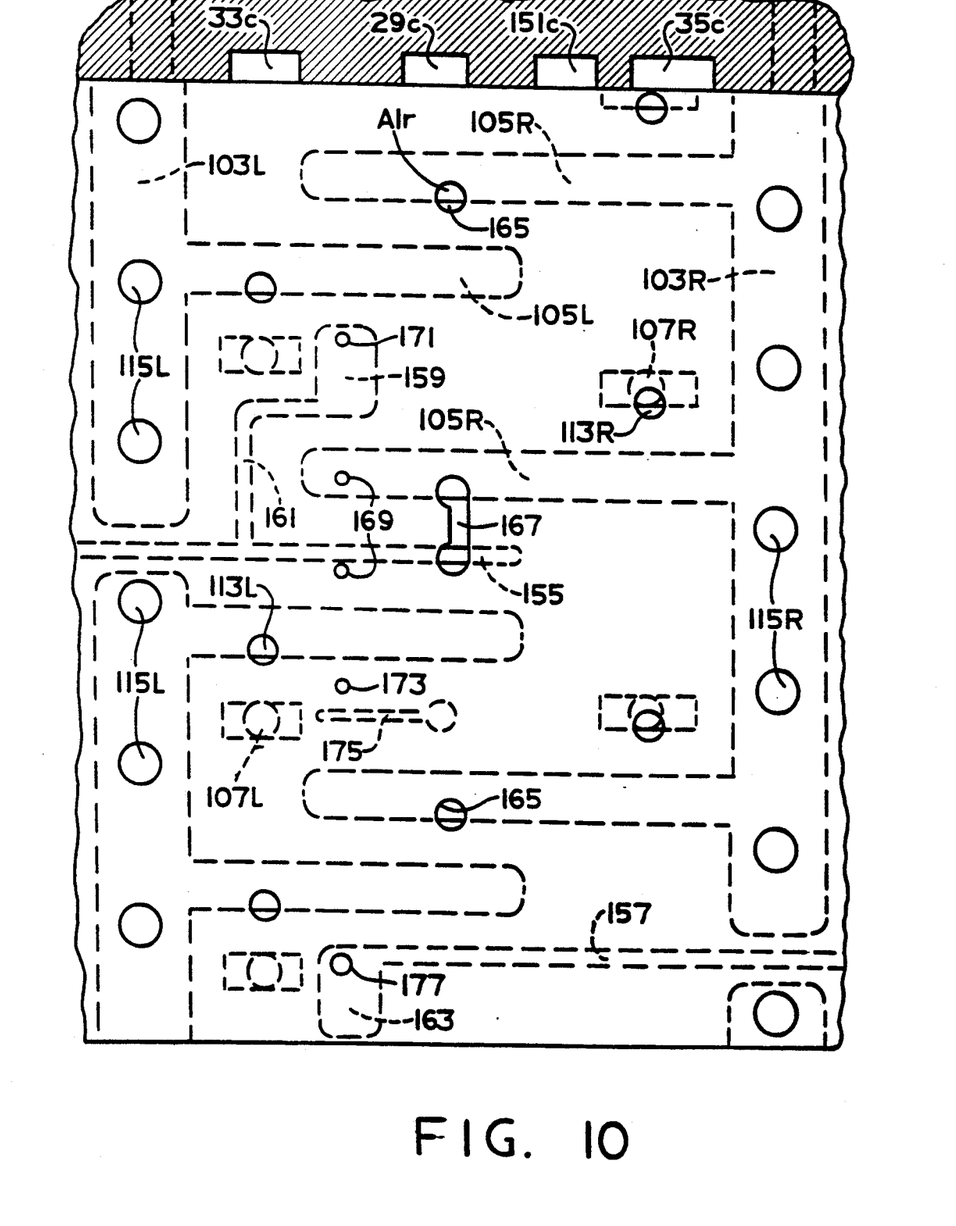
FIG. 10 is an enlarged, fragmentary, overlay view of the valve members shown in FIGS. 8 and 9, with the valving in a neutral rotary position and a first axial position.

It is one important aspect of the present invention to provide a neutral centering spring arrangement for a fluid controller which is able to define flow control orifices in the valving in response to both relative rotary motion of the spool and sleeve, and relative axial motion of the sleeve, and preferably, to be able to do so simultaneously. In the embodiment of FIGS. 1 through 6, relative axial motion between the spool and sleeve defines a fluid path in parallel with the main fluid path, but still communicating with the control fluid ports 33 and 35. In the embodiment of FIGS. 8 through 10, relative axial motion between the sleeve and the housing define an auxiliary fluid path which may, for example, be communicated to an auxiliary device, rather than being communicated to the main control fluid ports 33 and 35. Therefore, it will be apparent to those skilled in the art that the present invention is not limited to any one particular spool and sleeve valving arrangement, except as specifically recited hereinafter in the appended claims, but is generally applicable to any fluid controller in which there is both relative rotary motion of the spool and sleeve, and axial motion of the sleeve, relative to the spool and housing.

Figure 3:
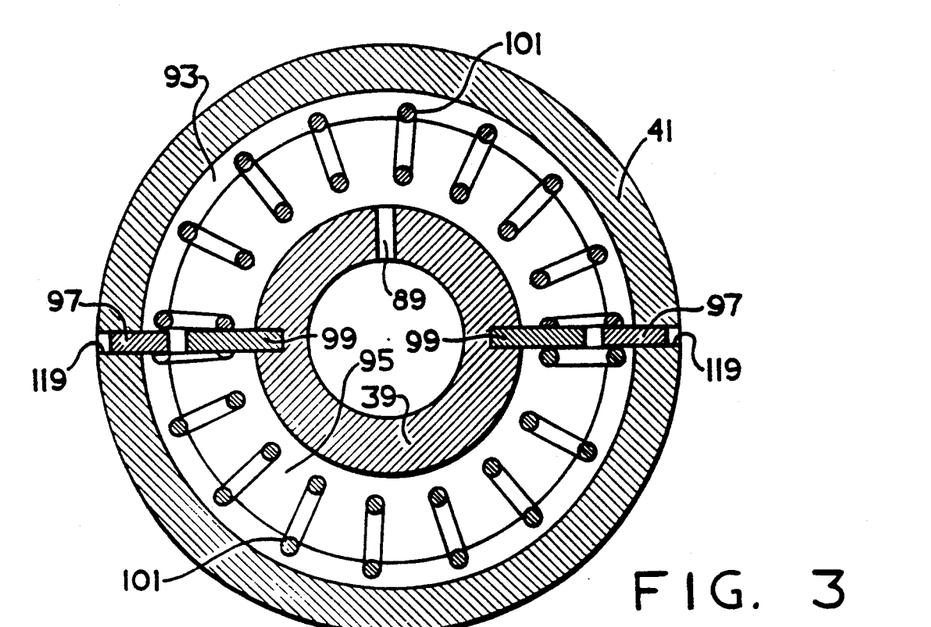
FIG. 3 is a transverse cross-section, through only the spool and sleeve, taken on line 3—3 of FIG. 2, and on approximately the same scale, and with the spool and sleeve in the neutral rotary position.
Figure 4:
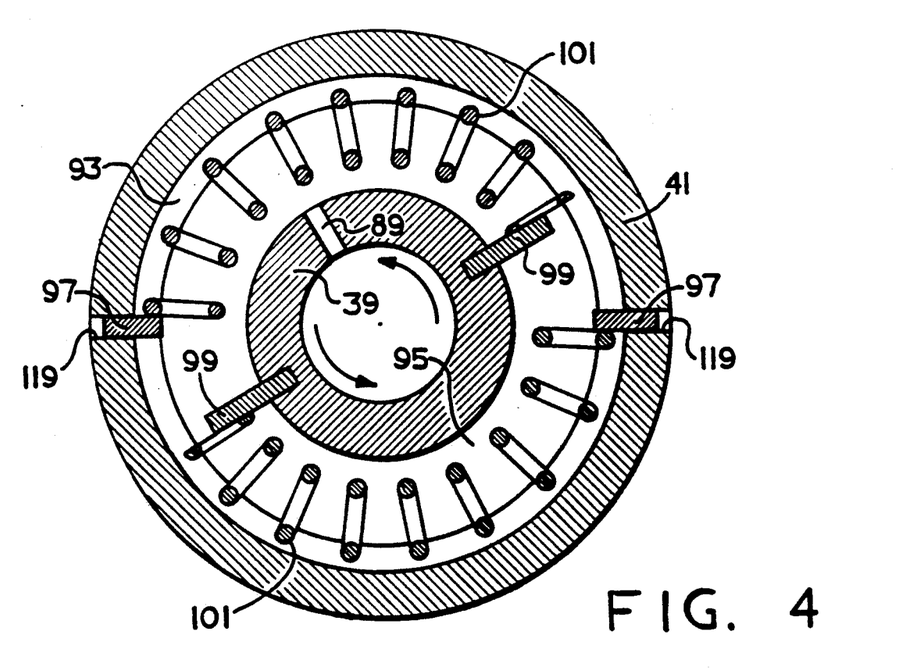
FIG. 4 is a transverse cross-section, similar to FIG. 3, but with the spool and sleeve in the rotary operating position

Referring now primarily to FIGS. 2 through 4, the rotary portion of the neutral centering spring arrangement will be described. The sleeve 41 defines, adjacent its forward end (left end in FIG. 2) a generally half-circular annular groove 93. Axially aligned therewith, the spool 39 defines a generally rectangular cross-section annular groove 95. Referring now primarily to FIG. 3, the sleeve 41 receives a pair of seat members 97, disposed within openings 119 (see FIG. 6), while the spool 39 receives a pair of seat members 99. The grooves 93 and 95 together define a spring chamber, and disposed within that spring chamber is a pair of coiled compression springs 101. With the spool and sleeve in the rotary neutral position shown in FIG. 3, each of the springs 101 has each of its ends seated against one of the seat members 97 and one of the seat members 99. It should be understood by those skilled in the art that the use of two of the springs 101 is not an essential feature of the invention. Depending upon the relative rotational displacement which is desired between the spool and sleeve, the rotary centering could be accomplished by only a single spring., as is shown in..above-incorporated U.S. Ser. No. 666,168, now U.S. Pat. No. 5,065,793, or there may be two springs as is shown herein, or there may be three or even more of the springs.

Referring now primarily to FIG. 4, the spool has been rotatably displaced, relative to the sleeve in a direction which is clockwise as viewed by the vehicle operator, but counterclockwise as viewed in FIG. 4 (see arrows) It should be noted that the relative rotational position of the spool and sleeve in FIG. 4 is not necessarily intended to be precisely representative of the rotary operating position shown in FIG. 7. With the sleeve 39 rotated as shown in FIG. 4, the counterclockwise end of each of the springs 101 remains seated against the seat members 97 received by the sleeve 41, while the clockwise end of each of the springs 101 remains seated against the seat members 99, received by the spool 39.

Referring again primarily to FIG. 2, one important aspect of the present invention is that the annular groove 95 is configured to permit not only relative rotation between the spool and sleeve as is shown in FIG. 4, but also, axial movement of the sleeve 41 relative to both the valve housing 19 and the spool 39. As was noted previously, the position of the sleeve 41 shown in FIG. 2 corresponds to the neutral axial position illustrated in FIG. 6. In this embodiment of the invention, it is desirable for the sleeve 41 to be able to move axially from the neutral axial position of FIG. 2 either forwardly (to the left in FIG. 2) or rearwardly (to the right in FIG. 2), to the axial operating position shown in FIG. 7. Therefore, the annular groove must be configured, relative to the springs 101 to permit the full range of desired axial movement of the sleeve 41 without the springs 101 interfering with, or engaging, either the spool 39 or the bearing set 73. It should be apparent to those skilled in the art that, within the scope of the present invention, the sleeve could define the rectangular cross-section groove, while the spool defines the half-circular groove.

Valving Arrangement

Figure 6:
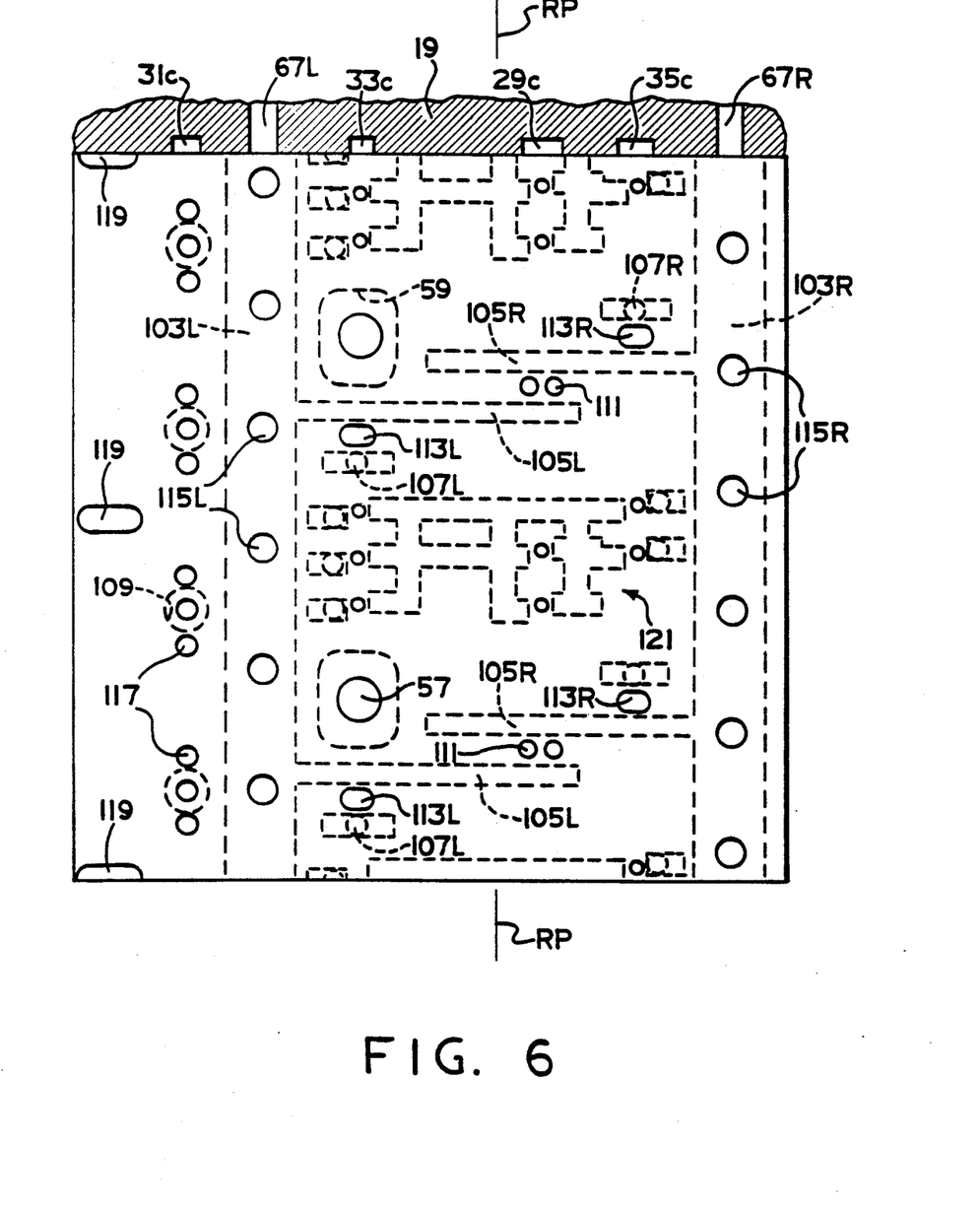
FIG. 6 is an overlay view of the valving included in the fluid controller of FIG. 1, but on a larger scale than in FIG. 1, and with the valving in the neutral rotary and neutral axial position.
Figure 7:
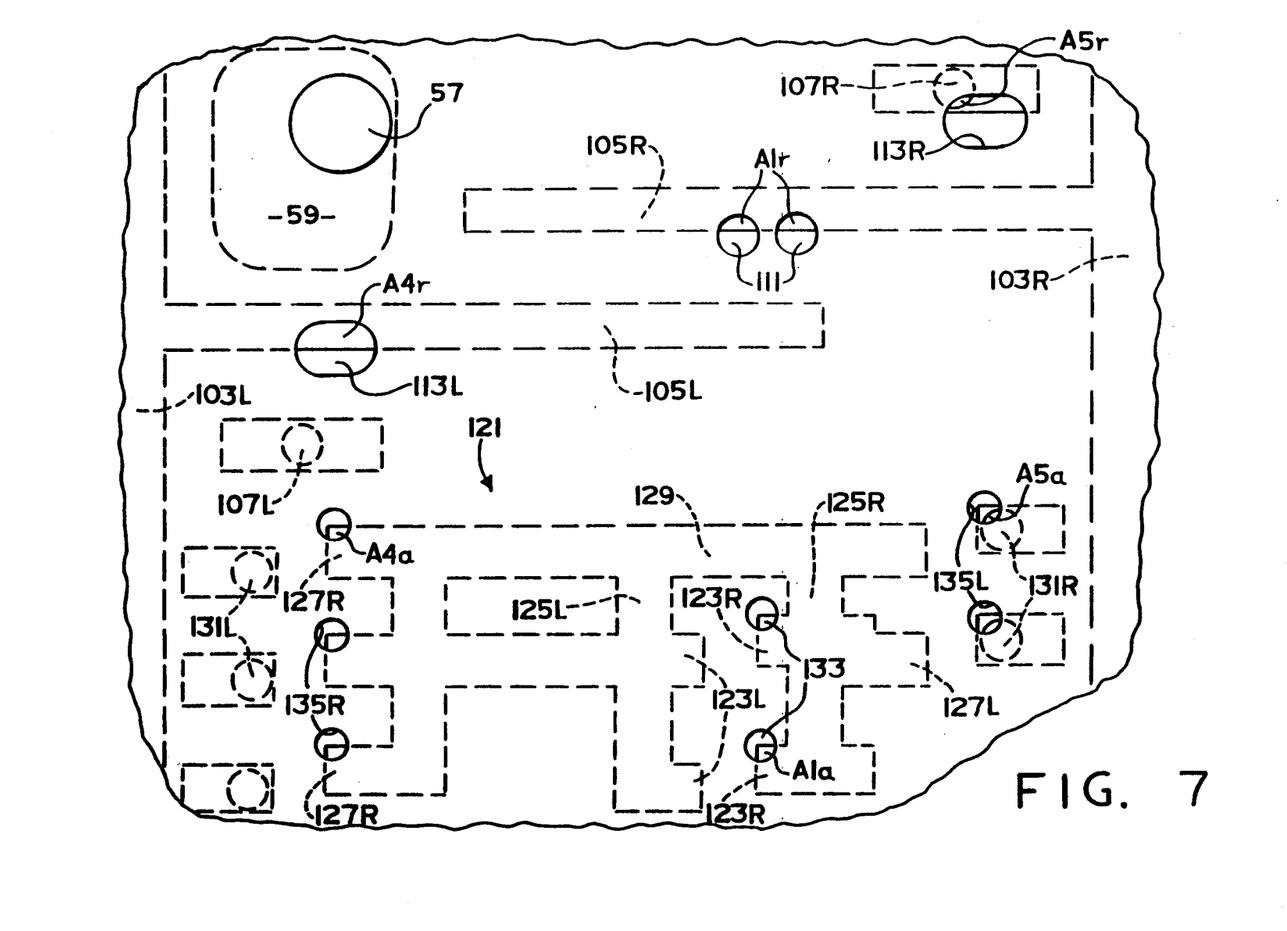
FIG. 7 is an enlarged, fragmentary, overlay view, similar to FIG. 6, but with the valving in a rotary operating and axial operating position.

Referring now primarily to FIG. 6, the spool 39 and sleeve 41 will be described in somewhat greater detail, with regard to the various ports and passages defined by the spool and sleeve. In connection with the subsequent description, it should be noted that certain of the ports and passages are arranged symmetrically, or generally symmetrically, with respect to an imaginary central reference plane RP, and such elements will be described by a reference numeral followed by either an "L" or an "R", to indicate that the element is located on either the left side or the right side, respectively of the reference plane RP. On the other hand, certain of the elements do not have a corresponding element, oppositely disposed about the reference plane RP and will be referred to by use of a reference numeral alone. It should be noted that the overlay views of FIGS. 6 and 7 are intended to illustrate primarily the interface between the spool 39 (dashed lines) and the sleeve 41 (solid lines), and as a result, certain structural features which appear only on the outer surface of the sleeve are not shown herein.

The spool 39 defines a pair of annular meter grooves 103L and 103R, which are axially aligned with the radial bores 67L and 67R, respectively. In communication with the meter groove 103L is a pressure passage 105L and in communication with the meter groove 103R is a pressure passage 105R. Circumferentially adjacent each of the pressure passages 105L is a return passage 107L, and circumferentially adjacent each of the pressure passages 105R, but in the opposite direction, is a return passage 107R. Toward the left end in FIG. 6, the spool 39 defines four tank ports 109. Both the return passages 107L and 107R, as well as the tank ports 109 extend to the interior of the spool 139.

The sleeve 41 defines two pairs of pressure ports 111, disposed somewhat to the right of the reference plane RP. The sleeve 41 further defines an operating port 113L, disposed adjacent the return passage 107L, and an operating port 113R, disposed adjacent the return passage 107R. The sleeve 41 further defines a plurality of meter ports 115L in continuous communication with the meter groove 103L, and a plurality of meter ports 115R, in continuous communication with the meter groove 103R. Each of the meter ports 115L and 115R include a generally rectangular opening on the outer surface of the sleeve (not shown herein), the purpose of which is to permit commutating fluid communication between the meter ports 115L and 115R, and the radial bores 67L and 67R, respectively, even when the sleeve 41 has been axially displaced in one direction or the other from the neutral axial position shown in FIG. 6. Disposed adjacent the left end of the sleeve 41 is the pair of openings 119 which receive the seat members 97. It will be understood that there are similar openings in the spool (not shown herein) which receive the seat members 99.

Finally, the sleeve 41 defines a plurality of tank ports 117, each of which is in continuous communication with the return port 31 by means of the annular chamber 31C. All of the ports and passages described thus far relate to the rotary valving which, because it is generally well known in the art, will be described only briefly hereinafter.

Referring now to FIG. 7, if the steering wheel and the spool 39 are rotated clockwise (i.e., the spool 39 moves "down" in FIG. 7), pressurized fluid flows from the inlet port 29 through the annular chamber 29c, then through the pressure ports 111 which are now overlapping the pressure passages 105R to define, cumulatively, a main variable flow control orifice (A1r), the designation "r" merely indicating an orifice formed in response to relative rotational movement of the spool and sleeve. Fluid flowing through the A1r orifice then flows into the meter groove 103R, then through the meter ports 115R to the fluid meter 23, with the metered fluid returning from the meter and flowing through the meter ports 115L and into the meter groove 103L. This metered fluid then enters the pressure passages 105L, which is now overlapping the operating ports 113L, the cumulative overlap therebetween defining a variable flow control orifice (A4r). Metered fluid flows from the A4r orifice to the annular chamber 33c, and from there to the control fluid port 33, and then to the steering cylinder or other device being operated by the controller. Fluid returning from the exhaust side of the device flows to the control fluid port 35, then into the annular chamber 35c, and then through an A5r orifice defined by the cumulative overlap of the operating ports 113R and the return passages 107R. This return fluid then flows through the interior of the spool 39, then radially outward through the tank ports 109, then through the tank ports 117 to the annular chamber 31c, and then to the return port 31. The above-described flow path thus comprises the "main fluid path" defined when the spool and sleeve are displaced from the neutral rotary position of FIG. 6 to the rotary operating position of FIG. 7.

Referring again to FIG. 6, it may be seen that axially adjacent each of the openings 119 and circumferentially "above" the pin openings 59 is a region of ports and passages defined by the sleeve and spool which together comprise the axial valving, generally designated 121, to be described in greater detail subsequently.

Referring now to FIG. 7, one of the regions of the axial valving 121 will be described. The spool 41 defines a plurality of axially extending pressure passages 123L, which are interconnected by a circumferentially extending passage 125L, and the spool 39 further defines a plurality of axially extending pressure passages 123R, which are interconnected by circumferentially extending passage 125R. The pressure passages 123L are in unrestricted communication with a plurality of operating passages 127L by means of an axial connection passage 129. Similarly, the pressure passages 123R are in unrestricted communication with a plurality of operating passages 127R by the axial connection passage 129. The spool further defines a plurality of tank passages 131L and a plurality of tank passages 131R.

The sleeve 41 defines a plurality of pressure ports 133, which are in continuous communication with the inlet port 29 through the annular chamber 29c. The sleeve also defines a plurality of operating ports 135L, and a plurality of operating ports 135R. It should be noted that in regard to the axial valving 121, the designations "L" and "R" don't necessarily indicate position of the various ports and passages, relative to the reference plane RP, but are related more to the direction of flow.

In accordance with the teachings of above-incorporated U.S. Ser. No. 703,318, now U.S. Pat. No. 5,115,640, for any given rotation of the steering wheel, there is an "error" signal indicating the need for additional fluid flow through the axial valving 121 in order to achieve the desired total flow to the steering cylinder. Assuming that the axial position of the sleeve shown in FIG. 7 corresponds to the instantaneous "error" signal, the parallel fluid path achieved by the axial valving 121 will now be described. With the sleeve in the position shown in FIG. 107 (note the position of the driving pin 57 in the pin opening 59) each of the pressure ports 133 is in communication with one of the pressure passages 123R, the cumulative overlap therebetween defining an (A1a) orifice, the designation "a" merely indicating an orifice formed in response to axial motion of the sleeve 41. Pressurized fluid flows from the annular chamber 29c through the pressure ports 133, then into the pressure passages 123R, then flows through the circumferential passage 125R, then through the connection passage 129 to the operating passages 127R. The passages 127R are now in communication with the operating ports 135R, the cumulative overlap therebetween defining an A4a orifice. The fluid flowing through the operating ports 135R then flows into the annular chamber 33c, recombining with the fluid in the main fluid path. As was described previously, the fluid returning from the steering cylinder flows through the annular chamber 35c, and from there, a portion flows through the remainder of the main fluid path. However, a portion of the fluid passes through an A5a orifice defined by the cumulative overlap between the operating ports 135L and the tank passages 131R. This fluid then recombines with the main fluid path in the interior of the spool 39, from where it flows into the system reservoir in a "regulated" manner, as was described previously, to thus provide the pilot pressure required to control the axial position of the sleeve 41.

Alternative Embodiment

Figure 9:
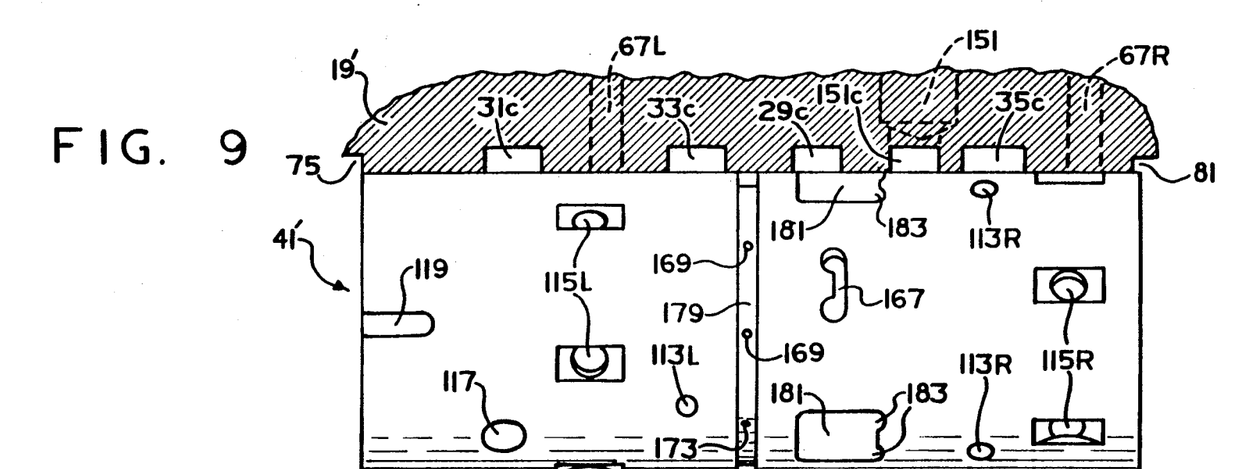
FIG. 9 is a plan view of a sleeve valve member, and a fragmentary axial cross-section of the housing, of the alternative embodiment of the present invention.

Referring now primarily to FIGS. 8, 9, and 10, there will be described an alternative embodiment of the present invention. By "alternative embodiment" in reference to FIGS. 8 through 10, it is meant that the neutral centering spring arrangement of the present invention, as illustrated in FIGS. 2 through 5, is being utilized in a different "environment", i.e., is being used in a fluid controller having a different valving configuration than in the primary environment. In the alternative embodiment, the valving includes rotary valving, the function of which is to define a main fluid path to the vehicle steering cylinder, in response to rotation of the steering wheel, as in the primary embodiment. The controller also includes axial valving, the function of which is to define an auxiliary fluid path, communicating excess fluid, not needed at the steering cylinder, to an auxiliary device, as will be described in greater detail subsequently.

A controller made in accordance with the alternative embodiment is illustrated and described in greater detail in above-incorporated U.S. Ser. No. 666,168, now U.S. Pat. No. 5,065,793, and will be described only briefly herein. In describing the alternative embodiment, certain elements which are the same or generally the same as in the primary embodiment bear the same reference numerals, or in some cases, the same numeral, plus a prime mark. Certain other elements are new in the alternative embodiment, and all such new elements will bear reference numerals in excess of "150".

The housing 19' of the controller defines the annular chambers 29c, 31c, 33c, and 35c, communicating with the inlet port 29, the return port 31, and the control ports 33 and 35, respectively. The housing 19' also defines an auxiliary control port 151 which is in communication with an annular chamber 151c.

Referring now primarily to FIGS. 8 and 10, the spool 39' defines the annular meter grooves 103L and 103R and the pressure passages 105L and 105R, respectively. Adjacent the pressure passages are the return passages 107L and 107R. To the left of the meter groove 103L, the spool 39' defines a pin opening 153, the location of which differs from that in the primary embodiment.

As may be seen in FIGS. 8 and 10, unlike conventional spool-sleeve fluid controllers, the annular meter grooves 103L and 103R of the alternative embodiment are not circumferentially continuous. Instead, the meter grooves 103L and 103R are interrupted, as will now be described. The spool 39' defines an axially-extending pilot pressure passage 155 which extends to the left to the annular groove 95 and pilot chamber 75 (see FIGS. 1 and 2). Similarly, the spool 39' defines an axially-extending load signal passage 157 (see FIG. 10) which extends to the right, to provide fluid communication to the pilot chamber 81, to be referred to hereafter as a load signal chamber (see FIGS. 1 and 5).

The spool 39' further defines a dynamic signal recess 159, which is in open communication with the pilot pressure passage 155, by means of a passage 161 which extends first circumferentially, and axially. Similarly, the spool 39' defines a load signal recess 163 (see FIG. 10), disposed at the left end of the load signal passage 157, and in communication therewith.

The sleeve 41' defines a pair of pressure ports 165, axially aligned with the annular chamber 29c. Disposed circumferentially between the ports 165 is a pilot port 167, the function of which will be described subsequently. Disposed to the left of the pilot port 167 is a pair of load sensing pick-up ports 169, and circumferentially disposed from the ports 169 is a dynamic signal pick up port 171, which is in continuous communication with the dynamic signal recess 159. Also circumferentially disposed from the ports 169 is a load signal drain port 173, which is in communication with a drain passage 175, defined by the spool, whenever the spool and sleeve are in the rotary neutral position. The drain passage 175 is in communication with the interior of the spool, in the same manner as the return passages 107L and 107R. Finally, further circumferentially disposed from the ports 169 is a load signal port 177, which is in continuous communication with the load signal recess 163. All of the ports 169, 171, 173, and 177 are in open communication with an annular load sensing groove 179, defined on the outer surface of the sleeve 41' (see FIG. 9).

The sleeve 41' further defines the operating ports 113L, disposed in axial alignment with the return passages 107L, and in continuous communication with the annular chamber 33c. Similarly, the sleeve defines the operating ports 113R, in axial alignment with the return passages 107R, and in continuous communication with the annular chamber 35c. Disposed further axially outward, the sleeve defines the meter ports 115L, in continuous communication with the meter groove 103L, and in commutating fluid communication with the radial bores 67L. Similarly, the sleeve defines the meter ports 115R, in continuous communication with the meter groove 103R, and in commutating communication with the radial bores 67R. To the left of the meter ports 115L in FIG. 9, the sleeve defines the tank ports 117, which are axially aligned with the pin openings 153, and are in continuous fluid communication with the annular chamber 31c. Finally, the sleeve defines the openings 119, within which are received the seat members 97 (see FIG. 3).

Rotary Operating Position

Referring now primarily to FIG. 10, if the steering wheel and the spool are rotated clockwise (i.e., the spool 39' moves "down" in FIG. 10), pressurized fluid flows from the chamber 29c through the pressure ports 165, into the pressure passages 105R, the cumulative overlap therebetween defining the main variable flow control orifice A1r. This "unmetered" fluid flows into the meter groove 103R, then through the meter ports 115R to the expanding volume chambers 61 of the fluid meter 23. "Metered" fluid flows from the contracting volume chambers of the fluid meter, then flows through the meter ports 115L, into the meter groove 103L, then into the pressure passages 105L. The passages 105L are now overlapped by the operating ports 113L, and metered fluid flows from there into the annular chamber 33c, then to the steering cylinder, and then back to the annular chamber 35c. From there the return fluid flows into the operating ports 113R, which now overlap the return passages 107R, such that the return fluid flows to the interior of the spool, then radially outward through the pin openings 153, and through the tank ports 117 to the annular groove 31c.

The above-described flow path comprises the main fluid path defined by the controller in the "rotary operating position", which is described in greater detail in above-incorporated U.S. Ser. No. 666,168, now U.S. Pat. No. 5,065,793. As in the primary embodiment, the main fluid path is considered as being defined at the interface of the spool and sleeve, because it is there that the various ports and passages overlap to define the variable flow control orifices of the main fluid path. However, as noted previously, commutating communication to and from the fluid meter 23 (which is part of the main fluid path) occurs at the interface of the sleeve and housing, but does not involve the formation of variable flow control orifices.

In both FIGS. 9 and 10, the sleeve 41' is in what might be considered its "normal" or first axial position, biased to the left by means which will now be described briefly, but are described in greater detail in above-incorporated U.S. Ser. No. 666,168, now U.S. Pat. No. 5,065,793. In FIG. 10, the pilot port 167 is also in communication with the annular chamber 29c, and receives pressurized fluid therefrom, the fluid in turn being communicated into the pilot pressure passage 155, and into the pilot chamber 75. The result is that the sleeve is biased to the right in FIG. 10 by fluid pressure in the pilot chamber 75, which is at the pressure of the main fluid path, upstream of the A1r orifice. At the same time, the "upper" of the two load sensing pick up ports 169 is in communication with one of the pressure passages 105R, and therefore, is communicating into the load sensing groove 179 the pressure of the main fluid path downstream of the A1r orifice. The load pressure in the groove 179 is communicated through the load sensing port 177 into the load signal recess 163, and from there through the load signal passage 157 into the load signal chamber 81. As a result, the sleeve is being biased to the left in FIG. 10 by a combination of the load pressure in the load signal chamber 81 and the compression springs 85. As will be understood by those skilled in the art, in the alternative embodiment, there would be no compression springs 77 in the pilot chamber 75. As is also well known to those skilled in the art, the biasing force of the springs 85 is selected to be approximately equal to the pressure drop across the A1 orifice (i.e., the difference between the pressure in the load signal passage 157 and the pressure in the pilot pressure passage 155). When these opposing forces are approximately balanced, the sleeve is biased to the left, to the position shown in FIGS. 9 and 10.

Referring now primarily to FIG. 9, certain additional structural features of the sleeve 41' will be described, such features not being shown on the overlay of FIG. 10, because they are defined only on the outer surface of the sleeve. The outer surface of the sleeve defines a plurality of recessed, axially-extending fluid passages 181. The left end of each of the passages 181 is in continuous fluid communication with the annular chamber 29c, and the right end of each of the passages 181 terminates in a pair of arcuate metering portions 183.

As may best be seen in FIG. 9, when the steering system is demanding all of the fluid being delivered by the fluid source, the sleeve 41' is biased to the left, to a position in which the metering portions 183 are disposed to the left of the auxiliary chamber 151c and out of fluid communication therewith. Thus, the entire fluid delivery of the source flows through the main fluid path, as was previously described.

When the fluid delivery of the source begins to exceed the flow required by the steering cylinder (or conversely, the amount of fluid required by the steering cylinder decreases below the delivery of the source), the pressure drop across the A1r orifice begins to increase, i.e., the pressure in the pilot chamber 75 exceeds the pressure in the load signal chamber 81 by an amount slightly greater than the equivalent pressure of the compression springs 85. As this occurs, the sleeve 41' beings to shift to the right from the position shown in FIG. 9, until the metering portions 183 begin to communicate with the annular chamber 151c, the cumulative overlap therebetween defining an auxiliary flow control orifice. The sleeve continues to move to the right until a point is reached at which just enough fluid from the inlet port 29 is communicated through the fluid passages 181 to the annular chamber 151c to maintain a pressure differential between the chambers 75 and 81 equal to the equivalent pressure of the springs 85, and maintain that particular position of the sleeve 41'.

The neutral centering spring arrangement of the present invention has been described in connection with two different embodiments. In both embodiments, relative rotary motion of the spool and sleeve defines a main fluid path, and the springs 101 bias the spool and sleeve toward its neutral rotary position. In the first embodiment, the centering spring arrangement of the present invention permits axial movement of the sleeve from its neutral axial position, in either direction, to first and second axial operating positions in which the axial movement of the sleeve relative to the spool and housing defines a parallel fluid path. In the second embodiment, the neutral centering spring arrangement permits displacement of the sleeve from its normal or first axial position in which all flow is through the main fluid path, to a second axial position in which the sleeve and housing cooperate to define an auxiliary fluid path, and at least a portion of the fluid entering the controller flows through this auxiliary fluid path. The essential element of the present invention is the provision of a neutral centering spring arrangement which not only returns the spool and sleeve to their neutral rotary position, but also, permits relative axial motion therebetween to facilitate various other types of valving actuation.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A controller operable to control the flow of fluid from a source of pressurized fluid to a fluid pressure operated device; said controller being of the type including housing means defining a fluid inlet port for connection to the source of pressurized fluid, a return port for connection to a system reservoir, and first and second control fluid ports for connection to the fluid pressure operated device; valve means disposed in said housing means, and comprising a primary, rotatable valve member and a cooperating, relatively rotatable follow-up valve member, said primary and follow-up valve members defining a neutral rotary position, and a first rotary operating position, in which said primary valve member is rotatably displaced from said neutral rotary position, relative to said follow-up valve member, said follow-up valve member defining a neutral axial position, relative to said primary valve member; said housing means and said primary and follow-up valve members, when in said first rotary operating position, cooperating to define a first main fluid path providing fluid communication from said fluid inlet port to said first control fluid port, and from said second control fluid port to said return port; characterized by:
   (a) said follow-up valve member defining a first axial operating position relative to said primary valve member, in which said housing means and said primary and follow-up valve member define a first parallel fluid path providing fluid communication from said fluid inlet port to said first control fluid port, and from said second control fluid port to said return port;
   (b) said primary valve member and said follow-up valve member cooperating to define an annular spring chamber, said primary valve member defining a first seat, and said follow-up valve member defining a second seat;
   (c) compression spring means disposed in said annular spring chamber, and including a first end portion engaging said first seat, and a second end portion engaging said second seat, said compression spring means being operable to bias said primary and follow-up valve members from said rotary operating position toward said neutral rotary position; and
   (d) said spring chamber being configured to permit relative axial movement between said primary and follow-up valve members, as said follow-up valve member is displaced between said neutral axial position and said axial operating position.

2. A fluid controller as claimed in claim 1, characterized by said primary and follow-up valve members defining a second rotary operating position in which said primary valve member is rotatably displaced from said neutral rotary position, relative to said follow-up valve member in a direction opposite said first rotary operating position, said housing means and said primary and follow-up valve members, when in said second rotary operating position, cooperating to define a second main fluid path providing fluid communication from said fluid inlet port to said second control fluid port, and from said first control fluid port to said return port.

3. A fluid controller as claimed in claim 2, characterized by said follow-up valve member defining a second axial operating position relative to said primary valve member, in which said housing means and said primary and follow-up valve members define a second parallel fluid path providing fluid communication from said fluid inlet port to said second control fluid port, and from said first control fluid port to said return port in said second axial operating position, said follow-up valve member being axially displaced from said neutral axial position, in a direction opposite said first axial operating position, relative to said primary valve member.

4. A fluid controller as claimed in claim 1, characterized by said primary and follow-up valve members defining first and second annular grooves, respectively, said first and second annular grooves cooperating to define said annular spring chamber, one of said first and second annular grooves being configured to permit relative axial movement between said primary and follow-up valve members, as said follow-up valve member is displaced between said first and second axial operating positions.

5. A fluid controller as claimed in claim 4, characterized by said housing means and said follow-up valve member cooperating to define a first spring chamber disposed at a first axial end of said follow-up valve member; and first spring means disposed in said first spring chamber and operable to bias said follow-up valve member from said first axial operating position toward said neutral axial position.

6. A fluid controller as claimed in claim 5, characterized by said housing means and said follow-up valve member cooperating to define a second spring chamber disposed at a second axial end of said follow-up valve member; and second spring means disposed in said second spring chamber and operable to bias said follow-up valve member from said second axial operating position toward said neutral axial position.

7. A fluid controller as claimed in claim 6, characterized by means operable to generate a pressure signal and communicate, selectively, said pressure signal to said second spring chamber to bias said follow-up valve member from said neutral axial position to said first axial operating position, and to said first spring chamber to bias said follow-up valve member from said neutral axial position to said second axial operating position.

8. A fluid controller as claimed in claim 4, characterized by fluid actuated means for imparting rotary follow-up movement to said follow-up valve member proportional to the volume of fluid flow through said first and second main fluid paths, when said valve members are in said first and second rotary operating positions, respectively.

9. A fluid controller as claimed in claim 4, characterized by said first and second main fluid paths including said fluid actuated means when said valve members are in said first and second rotary operating positions, respectively; and said first and second parallel fluid paths excluding said fluid actuated means when said valve members are in said first and second axial operating positions, respectively.

10. A controller operable to control the flow of fluid from a source of pressurized fluid to a first fluid pressure operated device, and to a second fluid pressure operated device; said controller being of the type including housing means defining a fluid inlet port for connection to the source of pressurized fluid, first and second control fluid ports for connection to the first and second fluid pressure operated devices, respectively; valve means disposed in said housing means, and comprising a primary, rotatable valve member and a cooperating, relatively rotatable follow-up valve member, said primary and follow-up valve members defining a neutral rotary position, a rotary operating position in which said primary valve member is rotatably displaced from said neutral rotary position, relative to said follow-up valve member, said follow-up valve member defining a first axial position, relative to said housing means; said housing means and said primary and follow-up valve members, when in said rotary operating position, cooperating to define a main fluid path providing fluid communication from said fluid inlet port to said first control fluid port, said follow-up valve member when in said first axial position, blocking fluid communication from said fluid inlet port to said second control fluid port; characterized by:

(a) said follow-up valve member defining a second axial position, relative to said housing means, in which said follow-up valve member permits fluid communication from said fluid inlet port to said second control fluid port;

(b) said primary valve member and said follow-up valve member cooperating to define an annular spring chamber, said primary valve member defining a first seat, and said follow-up valve member defining a second seat;

(c) compression spring means disposed in said annular spring chamber, and including a first end portion engaging said first seat, and a second end portion engaging said second seat said compression spring means being operable to bias said primary and follow-up valve members from said rotary operating position toward said neutral rotary position; and (d) said spring chamber being configured to permit relative axial movement between said primary and follow-up valve members, as said follow-up valve member is displaced between said first and second axial positions.

11. A fluid controller as claimed in claim 10, characterized by said housing means and said follow-up valve member cooperating to define a spring chamber disposed at one axial end of said follow-up valve member; and spring means disposed in said spring chamber and operable to bias said follow-up valve member from said second axial position toward said first axial position.

12. A fluid controller as claimed in claim 11, characterized by means operable to generate a pressure signal and communicate said pressure signal to a pressure chamber defined by said housing means and said follow-up valve member, said pressure signal in said pressure chamber exerting a biasing force on said follow-up valve member in opposition to the force of said spring means disposed in said spring chamber, said pressure signal biasing said follow-up valve member from said first axial position toward said second axial position.

13. A fluid controller as claimed in claim 10, characterized by fluid actuated means for imparting rotary follow-up movement to said follow-up valve member proportional to the volume of fluid flow through said main fluid path when said valve members are in said rotary operating position.

14. A fluid controller as claimed in claim 13, characterized by said fluid communication from said fluid inlet port to said second control fluid port, when said follow-up valve member is in said second axial position, comprising an auxiliary fluid path, said main fluid path including said fluid actuated means and said auxiliary fluid path excluding said fluid actuated means.

15. A fluid controller as claimed in claim 14, characterized by said auxiliary fluid path being in fluid parallel with said main fluid path.

16. A fluid controller as claimed in claim 10, characterized by said compression spring means comprising an elongated, coiled, compression spring member.

17. A controller operable to control the flow of fluid from a source of pressurized fluid to a fluid pressure operated device; said controller being of the type including housing means defining a fluid inlet port for connection to the source of pressurized fluid, a return port for connection to a system reservoir, and first and second control fluid ports for connection to the fluid pressure operated device; valve means disposed in said housing means, and comprising a primary, rotatable valve member and a cooperating, relatively rotatable follow-up valve member, said primary and follow-up valve members defining a neutral rotary position, and a first rotary operating position, in which said primary valve member is rotatably displaced from said neutral rotary position, relative to said follow-up valve member, one of said primary and follow-up valve members defining a neutral axial position, relative to the other of said primary valve member; said housing means and said primary and follow-up valve members, when in said first rotary operating position, cooperating to define a first main fluid path, including fluid orifice means providing fluid communication from said fluid inlet port to said first control fluid port, and from said second control fluid port to said return port; characterized by:
 (a) said one of said primary and follow-up valve members defining an axial operating position relative to the other of said primary valve members, movement of said one of said primary and follow-up valve members from said neutral axial position to said axial operating position being operable to vary said fluid orifice means and the fluid flow through said first fluid path;
 (b) said primary and follow-up valve members cooperating to define an annular spring chamber, said primary valve member defining a first seat, and said follow-up valve member defining a second seat;
 (c) compression spring means disposed in said annular spring chamber, and including a first end portion engaging said first seat, and a second end portion engaging said second seat, said compression spring means being operable to bias said primary and follow-up valve members from said rotary operating position toward said neutral rotary position; and
 (d) said spring chamber being configured to permit relative axial movement between said primary and follow-up valve members, as said one of said primary and follow-up valve members is displaced between said neutral axial position and said axial operating position.

18. A fluid controller as claimed in claim 17, characterized by said primary and follow-up valve members defining a second rotary operating position in which said primary valve member is rotatably displaced from said neutral rotary position, relative to said follow-up valve member in a direction opposite said first rotary operating position, said housing means and said primary and follow-up valve members, when in said second rotary operating position, cooperating to define a second fluid path, including second fluid orifice means, providing fluid communication from said fluid inlet port to said second control fluid port, and from said first control fluid port to said return port.

19. A fluid controller as claimed in claim 18, characterized by said one of said primary and follow-up valve members defining a second axial operating position relative to the other of said primary and follow-up valve members, movement of said one of said primary and follow-up valve members from said neutral axial position to said second axial operating position being operable to vary said second fluid orifice means and the fluid flow through said second fluid path.

20. A fluid controller as claimed in claim 19, characterized by said primary and follow-up valve members defining first and second annular grooves, respectively, said first and second annular grooves cooperating to define said annular spring chamber, one of said first and second annular grooves being configured to permit relative axial movement between said primary and follow-up valve members, as said one of said primary and follow-up valve members is displaced between said first and second axial operating positions.

21. A fluid controller as claimed in claim 20, characterized by said housing means and said one of said primary and follow-up valve members cooperating to define a first spring chamber disposed at a first axial end of said one of said primary and follow-up valve members; and first spring means disposed in said first spring chamber and operable to bias said one of said primary and follow-up valve members from said first axial operating position towards said neutral axial position.

22. A fluid controller as claimed in claim 21, characterized by said housing means and said one of said primary and follow-up valve members cooperating to define a second spring chamber disposed at a second axial end of said one of said primary and follow-up valve members; and second spring means disposed in said second spring chamber and operable to bias said one of said primary and follow-up valve members from said second axial operating position toward said neutral axial position.

23. A fluid controller as claimed in claim 18, characterized by fluid actuated means for imparting rotary follow-up movement to said follow-up valve member proportional to the volume of fluid flow through said first and second fluid paths, when said valve members are in said first and second rotary operating positions, respectively.

24. A fluid controller as claimed in claim 17, characterized by said one of said primary and follow-up valve members defining said neutral axial position comprising said follow-up valve member.

* * * * *